(12) United States Patent
Sheu et al.

(10) Patent No.: US 11,087,720 B1
(45) Date of Patent: Aug. 10, 2021

(54) ADJUSTING AN EDGE USER INTERFACE DISPLAY OF AN INFORMATION HANDLING SYSTEM

(71) Applicant: Dell Products L.P., Round Rock, TX (US)

(72) Inventors: Weijong Sheu, Austin, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/889,423

(22) Filed: Jun. 1, 2020

(51) Int. Cl.
*G09G 5/38* (2006.01)

(52) U.S. Cl.
CPC ........... *G09G 5/38* (2013.01); *G09G 2354/00* (2013.01)

(58) Field of Classification Search
CPC .............................. G09G 5/38; G09G 2354/00
See application file for complete search history.

(56) References Cited

U.S. PATENT DOCUMENTS

2017/0161006 A1\* 6/2017 Kwon ..................... G06F 3/147
2018/0188774 A1\* 7/2018 Ent ........................ G06F 1/1618

\* cited by examiner

*Primary Examiner* — Samantha (Yuehan) Wang
(74) *Attorney, Agent, or Firm* — Baker Botts L.L.P.

(57) ABSTRACT

Methods, systems, and computer programs encoded on computer storage medium, for detecting a relative positioning between a first body and a second body of a hinged information handling system; detecting an orientation of the hinged information handling system with respect to a surface; detecting a relative positioning between the hinged information handling system and a user of the hinged information handling system; determining an edge user interface display state based on the i) relative positioning between the first body and the second body of the hinged information handling system, ii) the orientation of the hinged information handling system, and iii) the relative positioning between the hinged information handling system and the user of the hinged information handling system; and adjusting a display location of an edge user interface based on the determined edge user interface display state.

20 Claims, 11 Drawing Sheets

ADJUSTING AN EDGE USER INTERFACE DISPLAY OF AN INFORMATION HANDLING SYSTEM

BACKGROUND

Field of the Disclosure

The disclosure relates generally to information handling systems, and specifically, adjusting an edge user interface display of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The status of various system states (e.g., messaging, battery, connectivity) of are importance to the user of the information handling system. Users want to know such information easily, without unnecessary steps to obtain such information.

SUMMARY

Innovative aspects of the subject matter described in this specification may be embodied in a method of detecting a relative positioning between a first body and a second body of a hinged information handling system; detecting an orientation of the hinged information handling system with respect to a surface; detecting a relative positioning between the hinged information handling system and a user of the hinged information handling system; determining an edge user interface display state based on the i) relative positioning between the first body and the second body of the hinged information handling system, ii) the orientation of the hinged information handling system, and iii) the relative positioning between the hinged information handling system and the user of the hinged information handling system; and adjusting a display location of an edge user interface based on the determined edge user interface display state.

Other embodiments of these aspects include corresponding systems, apparatus, and computer programs, configured to perform the actions of the methods, encoded on computer storage devices.

These and other embodiments may each optionally include one or more of the following features. For instance, detecting the relative positioning between the first body and the second body of the hinged information handling system further includes detecting a closed positioning between the first body and the second body of the hinged information handling system, and wherein detecting the orientation of the hinged information handling system further includes detecting a vertical orientation of the hinged information handling system, wherein the edge user interface display state is based on the closed positioning between the first body and the second body of the hinged information handling system and the vertical orientation of the hinged information handling system. Adjusting the display location of the edge user interface further includes adjusting the display location of the edge user interface to a front edge of the first body of the hinged information handling system based on the closed positioning between the first body and the second body of the hinged information handling system and the vertical orientation of the hinged information handling system. Detecting the relative positioning between the first body and the second body of the hinged information handling system further includes detecting a closed positioning between the first body and the second body of the hinged information handling system, and wherein detecting the orientation of the hinged information handling system further includes detecting a horizontal orientation of the hinged information handling system, wherein the edge user interface display state is based on the closed positioning between the first body and the second body of the hinged information handling system and the horizontal orientation of the hinged information handling system. Adjusting the display location of the edge user interface further includes adjusting the display location of the edge user interface to an upper edge of the first body of the hinged information handling system based on the closed positioning between the first body and the second body of the hinged information handling system and the horizontal orientation of the hinged information handling system. Detecting the relative positioning between the first body and the second body of the hinged information handling system further includes detecting an open positioning between the first body and the second body of the hinged information handling system, and wherein detecting the relative positioning between the hinged information handling system and the user of the hinged information handling system includes detecting forward facing direction of the user relative to the hinged information handling system, wherein the edge user interface display state is based on the open positioning between the first body and the second body of the hinged information handling system and the forward facing direction of the user relative to the hinged information handling system. Adjusting the display location of the edge user interface further includes adjusting the display location of the edge user interface to a front edge of the second body of the hinged information handling system based on the open positioning between the first body and the second body of the hinged information handling system and the forward facing direction of the user relative to the hinged information handling system. Detecting the relative positioning between the first body and the second body of the hinged information handling system further includes detecting an open positioning between the first body and the second body of the hinged information handling system, and wherein detecting the relative positioning between the hinged information handling system and the user of the hinged information handling system includes detecting an angled facing direction of the user relative to the hinged information handling system, wherein the edge user interface display state is based on the open positioning between the first body and the second body of the hinged information handling system and the angled facing direction of the user relative to the hinged information handling system. Adjusting the display location of the edge user interface further includes adjusting the display location of the edge user interface to an upper edge of the second body of the hinged information handling system based on the open positioning between the first body and the second body of the hinged information handling system and the angled facing direction of the user relative to the hinged information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
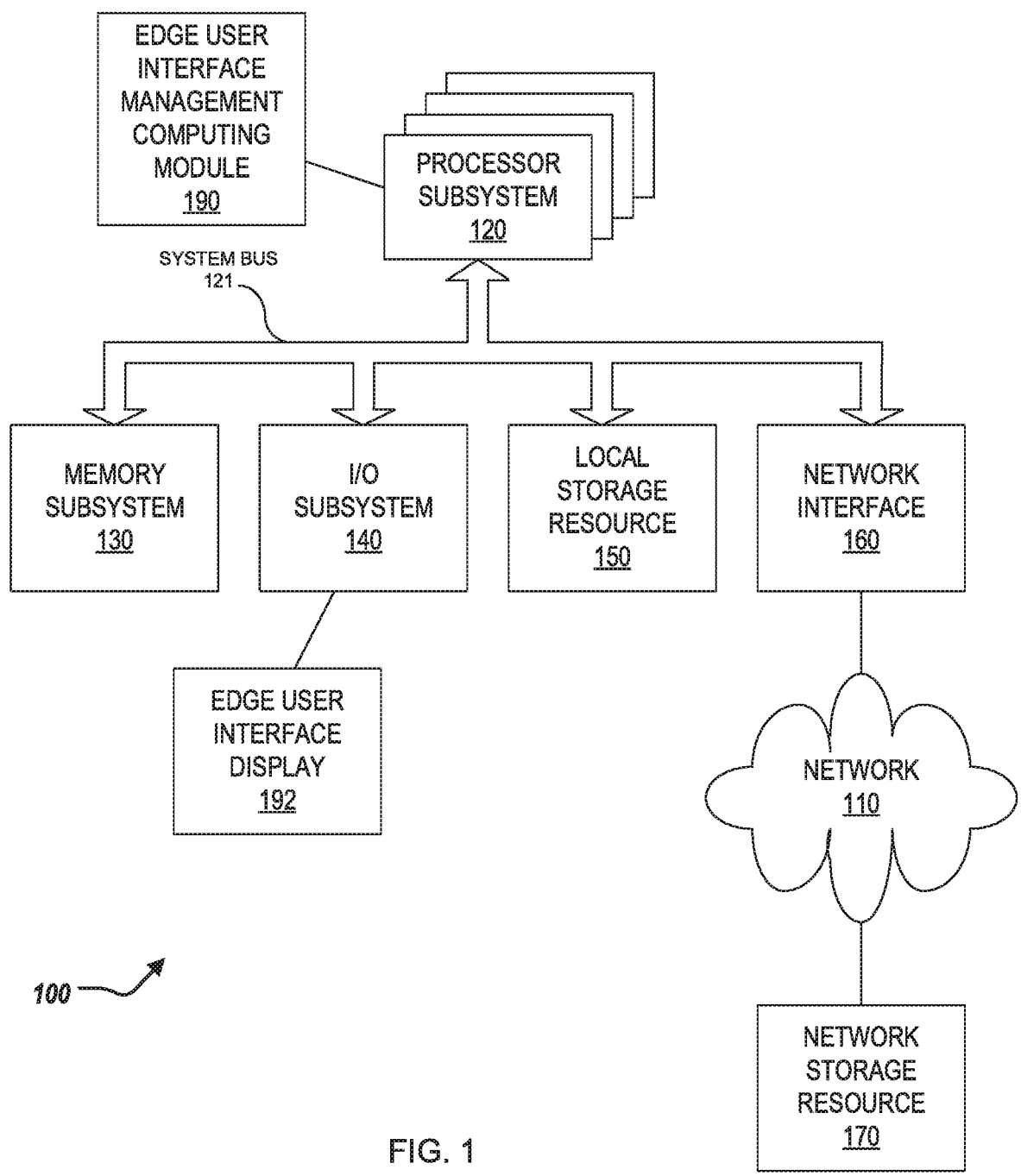
FIG. 1 illustrates a block diagram of selected elements of an embodiment of an information handling system.

This disclosure discusses systems and methods for adjusting a display location of status icons of an information handling system. Specifically, this disclosure discusses identifying sensor data indicating i) a relative positioning of bodies of the information handling system (e.g., two bodies connected by a hinge of the information handling system), ii) an orientation of the information handling system, and iii) a relative positioning between a user and the information handling system; and processing such sensor data to identify an edge user interface display state. A display location of an edge UI of the information handling system can be adjusted based on this edge user interface display state, and ultimately, based on the i) the relative positioning of bodies of the information handling system, ii) the orientation of the information handling system, and ii) the relative positioning between a user and the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-11 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can further include an edge user interface (UI) display 192. For example, the edge UI display 192 can be included by the I/O subsystem 140, and/or in communication with the I/O subsystem 140. The edge UI display 192 is a display that is positioned at one or more physical edges of the information handling system 100. The edge UI display 192 can be on an interior or an exterior edge of any body of the information handling system 100, described further herein. The edge UI display 192 can display status identifiers relevant to the information handling system 100, such as connectivity, battery, messaging, among others. The edge UI display 192 can be separate from a main display (or main displays) of the information handling system 100, described further herein.

The information handling system 100 can include an edge user interface management computing module 190. For example, the edge user interface (UI) management computing module 190 can be included by the processor subsystem 120, and/or in communication with the processor subsystem 120. The edge UI management computing module 190 can receive sensor data about the information handling system 100 and update a display location of the edge UI display 192. For example, based on such sensor data, the edge UI management computing module 190 can provide the edge UI display 192 at varying locations around the edge of the information handling system 100, described further herein.

Figure 2:
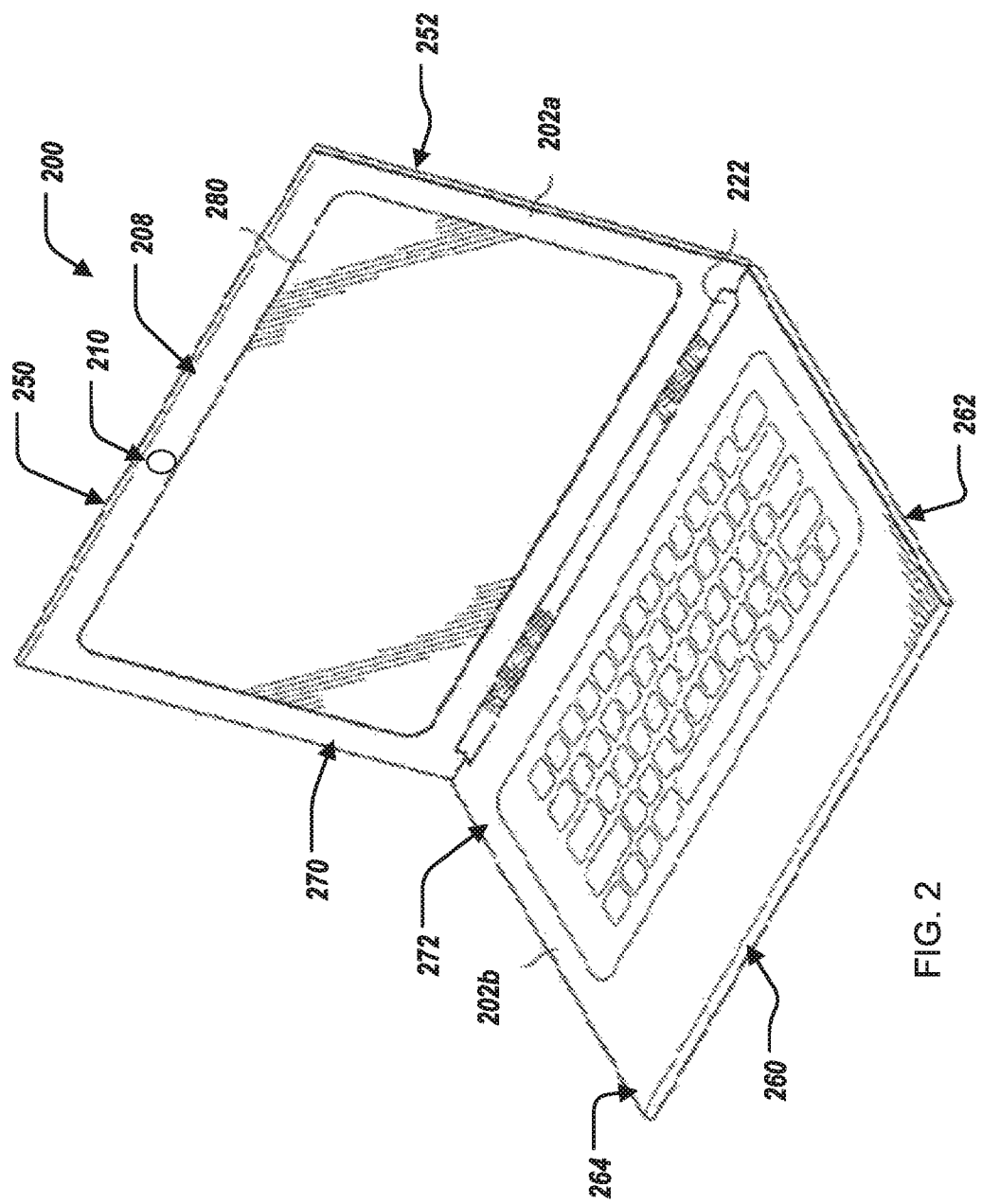
FIG. 2 illustrates a perspective view of the information handling system including two bodies.

FIG. 2 illustrates a dual-body (or two-body) hinged information handling system 200, similar to the information handling system 100 of FIG. 1. The dual-body information handling system 200 can include a first body 202a and a second body 202b (collectively referred to as bodies 202) connected by a hinging apparatus 222. In some examples, the first body 202a can include a display 280 and the second body 202b can include a keyboard, and also include processing components such as the processor subsystem 120 and the edge user interface management computing module 190. In some examples, each of the bodies 202 can include a display.

The first body 202a can include a first surface 270 and the second body 202b can include a second surface 272. The first body 202a can further include a front edge 250 defined between the first surface 270 and a back surface 252 of the first body 202a; and, the first body 202a can further include an upper edge 254 (shown further in FIG. 7) positioned on the back surface 252 and proximate to the front edge 250. The second body 202b can further include a front edge 260 defined between the second surface 272 and a bottom surface 262; and the second body 202b can further include an upper edge 264 positioned on the second surface 272 and proximate to the front edge 260.

The front edge 250 and the upper edge 254 of the first body 202a; and the front edge 260 and the upper edge 264 of the second body 202a can each include the edge UI display 192.

The information handling system 200 can further include a camera 210. For example, the camera 210 can be positioned on the first surface 270 of the first body 202a. However, the camera 210 can be positioned on any surface of the first body 202a and the second body 202b. In some examples, the information handling system 200 can include multiple cameras 210.

Figure 3:
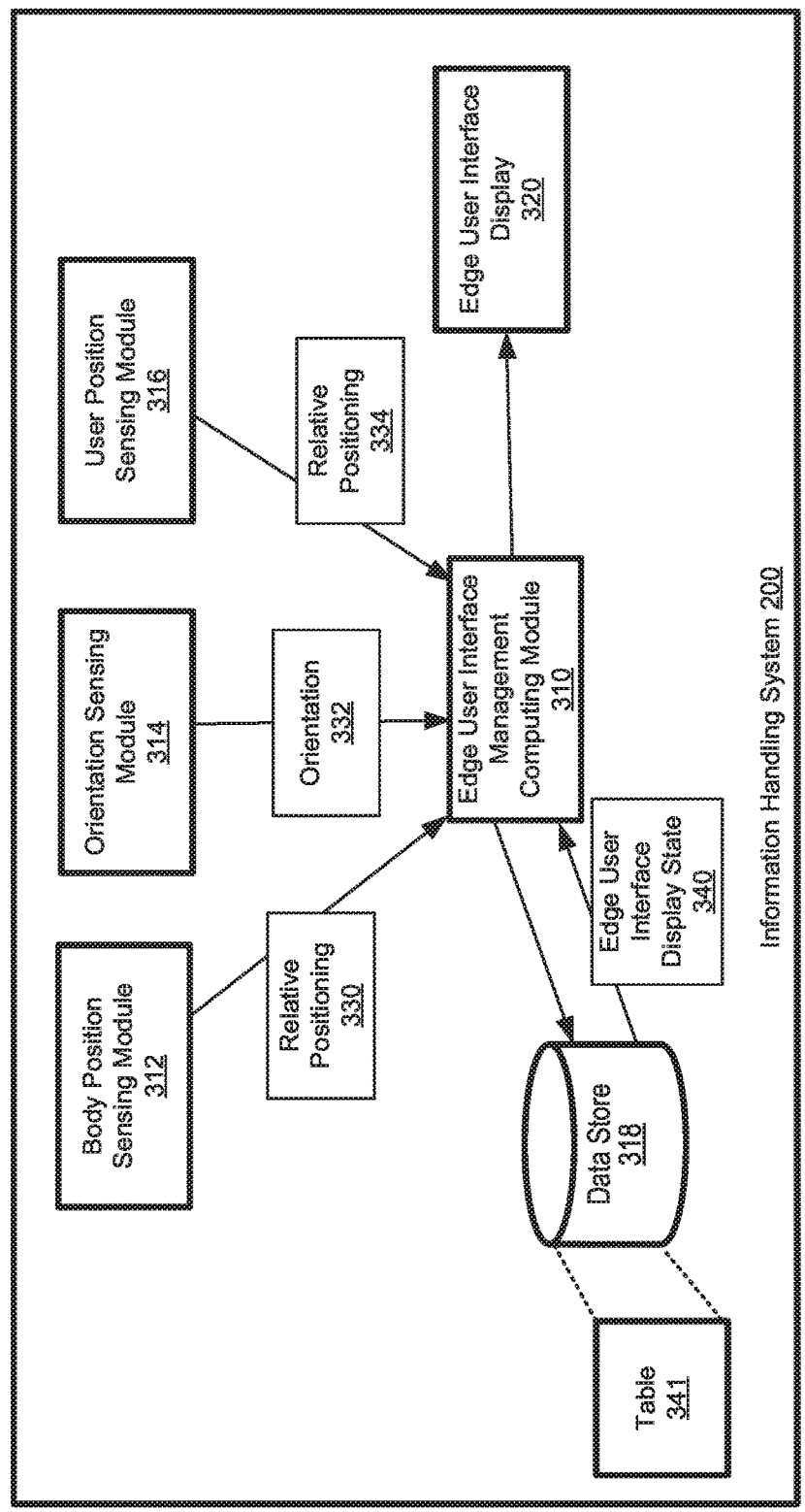
FIG. 3 illustrates a block diagram of the information handling system for adjusting an edge user interface display.

Turning to FIG. 3, FIG. 3 illustrates a computing environment 300 including the hinged information handling system 200. The information handling system 200 can include an edge user interface management computing module 310, a body position sensing module 312, an orientation sensing module 314, a user position sensing module 316, a data store 318, and an edge user interface display 320. The edge user interface (UI) management computing module 310 can be in communication with the body position sensing module 312, the orientation sensing module 314, the user position sensing module 316, the data store 318, and the edge user interface (UI) display 320. The edge UI management computing module 310 can be the same, or substantially similar to, the edge UI management computing module 190 of FIG. 1.

In short, the edge UI management computing module 310 can receive sensor data from the body position sensing module 312, the orientation sensing module 314, and the user position sensing module 316. The edge UI management computing module 310 can process the sensor data, and identify an edge UI display state based on the sensor data. The edge UI management computing module 310 can then adjust a display location of an edge UI on the edge UI display 320.

In some implementations, the body position sensing module 312 detects a relative positioning between the first body 202a and the second body 202b of the information handling system 200. For example, the information handling system 200 can be in a closed positioned state, or an open positioned state Specifically, when the first surface 270 of the first body 202a is proximate or adjacent to the second surface 272 of the second body 202b, the information handling system 200 is in a closed position (or state). Further, when the first surface 270 of the first body 202a is spaced-apart from the second surface 272 of the second body 202b, the information handling system 200 is in an open position (or state). In some examples, the body position sensing module 312 can include an accelerometer to detect the relative positioning between the first body 202a and the second body 202b of the information handling system 200.

Referring back to FIG. 3, the body position sensing module 312 can provide relative positioning data 330 indicating the relative positioning between the first body 202a and the second body 202b to the edge UI management computing module 310, e.g., automatically, or in response to a change in states detected by the body positioning sensing module 312.

In some implementations, the orientation sensing module 314 detects an orientation of the information handling system 200. For example, the information handling system 200 can be in a vertical orientation, or in a horizontal orientation. When the bodies 202 of the information handling system 200 are substantially horizontal, e.g., with respect to a surface such as a table top or the ground, the information handling system 200 is in a horizontal orientation. When the bodies 202 of the information handling system 200 are substantially vertical, e.g., with respect to a surface such as a table top or the ground, the information handling system 200 is in a vertical orientation. In some examples, the orientation sensing module 314 can include a magnetometer to detect the orientation of the information handling system 200. In some examples, the orientation sensing module 314 can include an accelerometer to detect the orientation of the information handling system 200.

The orientation sensing module 314 can provide orientation data 332 indicating the orientation of the information handling system 200 to the edge UI management computing module 310, e.g., automatically, or in response to a change in states detected by the orientation sensing module 314.

Figure 4:
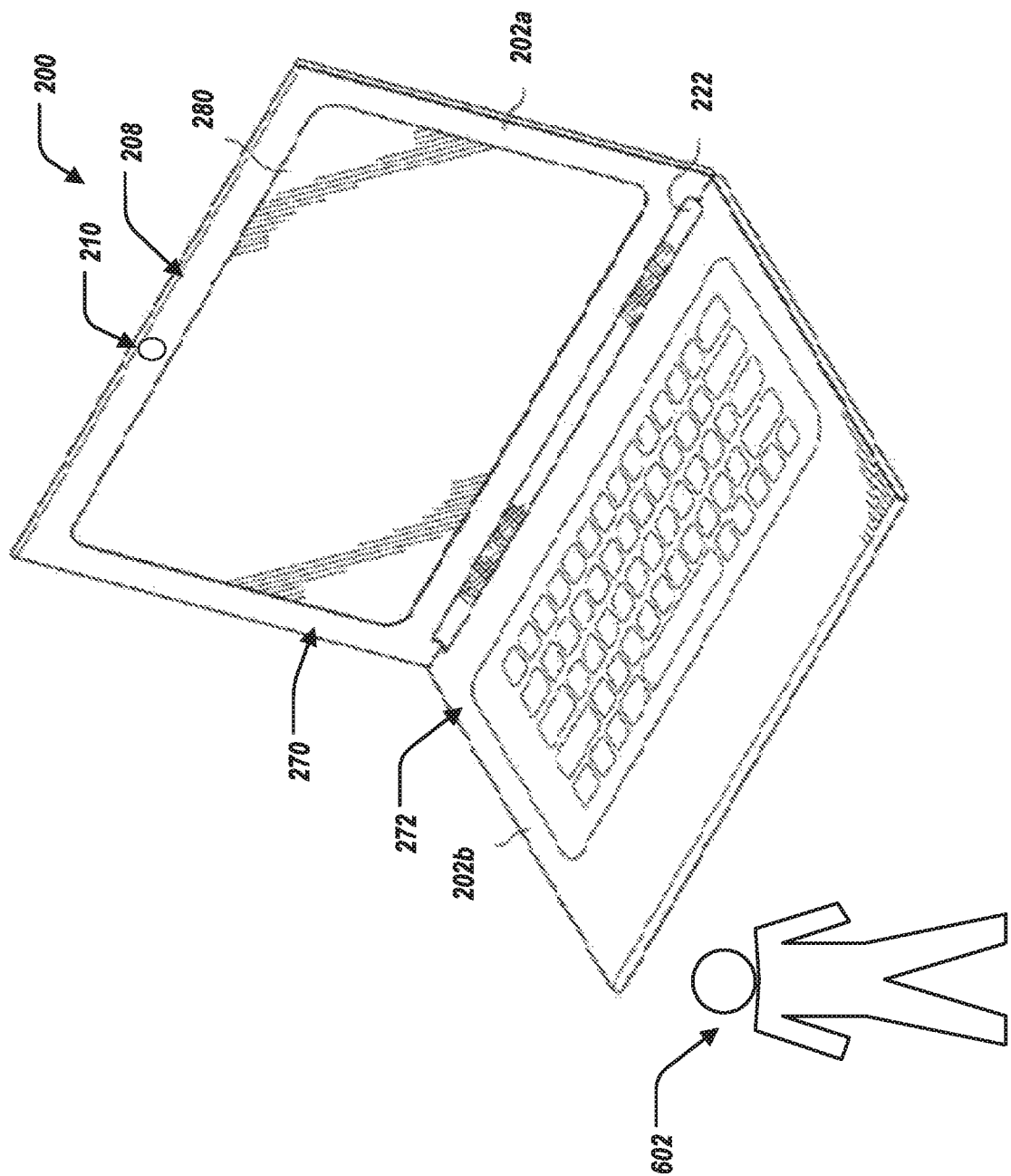
FIG. 4 illustrates a perspective view of a user in a forward facing direction with respect to the information handling system.
Figure 5:
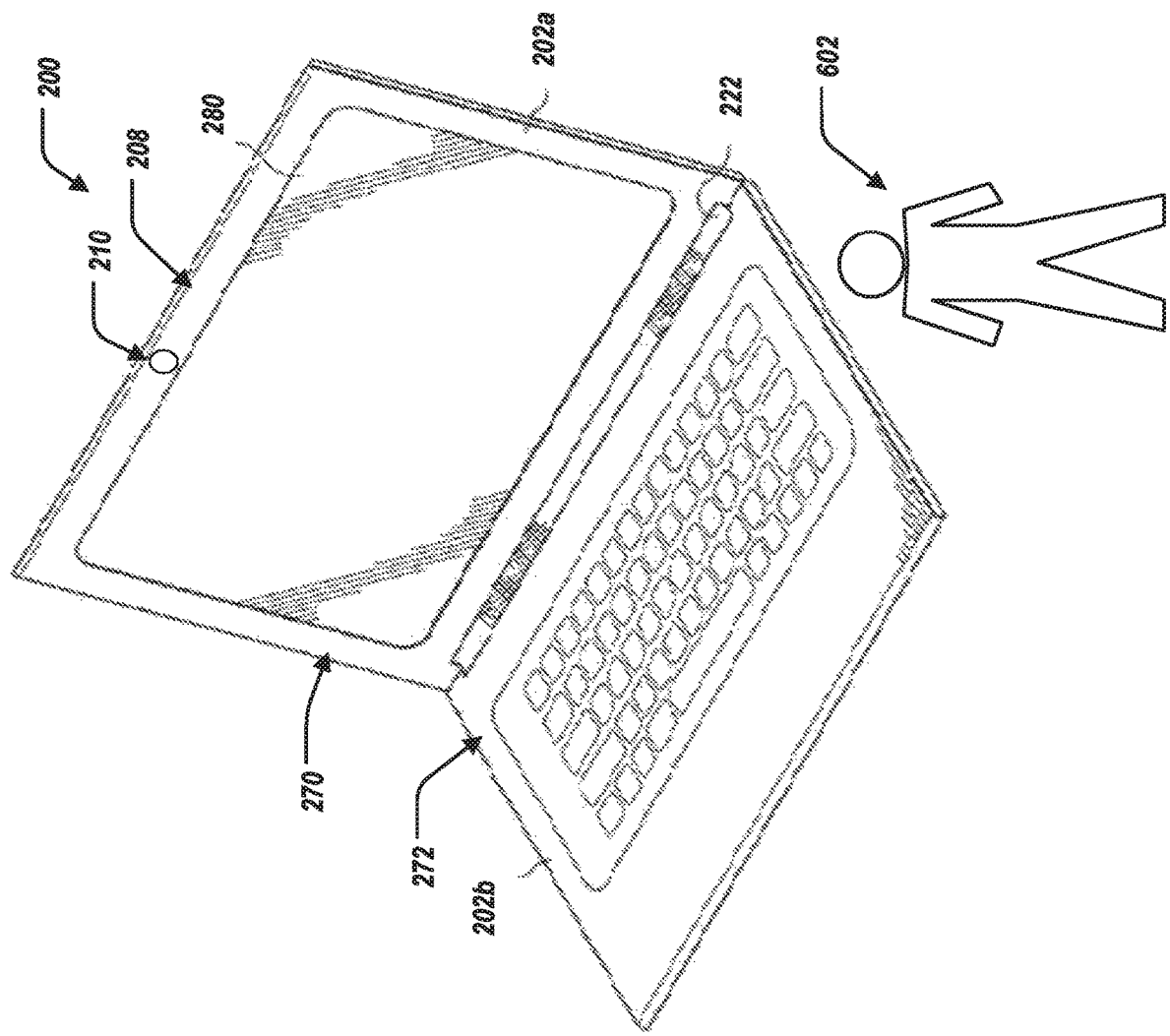
FIG. 5 illustrates a perspective view of the user in an angled facing direction with respect to the information handling system.

In some implementations, the user position sensing module 316 detects a relative positioning between the information handling system 200 and a user of the information handling system 200. For example, the user may be at a forward facing direction with respect to the information handling system 200, or at a angled facing direction with respect to the information handling system 200. As shown in FIG. 4, the user 602 is forward facing the information handling system 200. That is, the user 602 is facing the first surface 270 of the first body 202a. As shown in FIG. 5, the user 602 is angled facing the information handling system 200. That is, the user 602 is facing the first surface 270 of the first body 202a at an angle. In some examples, the user position sensing module 316 can include the camera 210 to detect the relative positioning between the information handling system 200 and the user 602 of the information handling system 200. For example, when the user position sensing module 316 includes the camera 210, the user position sensing module 316 can process images obtained by the camera 210 to detect whether the user 602 is present or proximate to the information handling system 200 (e.g., using machine learning, a neural network); and if the user 602 is present or proximate to the information handling system 200, the position sensing module 316 can detect the direction of the user 602 with respect to the first surface 270 of the first body 202a (e.g., using machine learning, a neural network).

The user position sensing module 316 can provide relative positioning data 334 indicating the relative positioning between the information handling system 200 and a user of the information handling system 200 to the edge UI management computing module 310, e.g., automatically, or in response to a change in states detected by user position sensing module 316.

The edge UI management computing module 310 can receive the relative positioning data 330, the orientation data 332, and the relative positioning data 334. In response to the data 330, 332, 334, the edge UI management computing module 310 can determine an edge user interface display state 340. Specifically, the edge UI management computing module 310 communicates with the data store 318 to identify the edge UI display state 340 based on the relative positioning data 330, the orientation data 332, and the relative positioning data 334. The data store 318 stores a database table 341 that includes associations between edge UI display states and the relative positioning data 330, the orientation data 332, and the relative positioning data 334. That is, for one or more combinations of one or more of the relative positioning data 330, the orientation data 332, and the relative positioning data 334, the table 341 identifies a corresponding edge UI display state 340. To that end, based on the relative positioning data 330, the orientation data 332, and the relative positioning data 334, the edge UI management computing module 310 accesses the table 341 to determine the edge UI display state 340.

In some implementations, the edge UI management computing module 310 adjusts a display location of the edge UI display 320 based on the edge UI display state 340. That is, the edge UI display 320 can be displayed along differing edges of the bodies 202, described further herein. The display location of the edge UI display 320 can be adjusted based on the edge UI display state 340, and more particularly, based on the relative positioning data 330, the orientation data 332, and the relative positioning data 334. The edge UI display 320 can display contextually information of the information handling system 200, such as network connectivity, battery state, on/off state, time, among other functional status icons.

Figure 6:
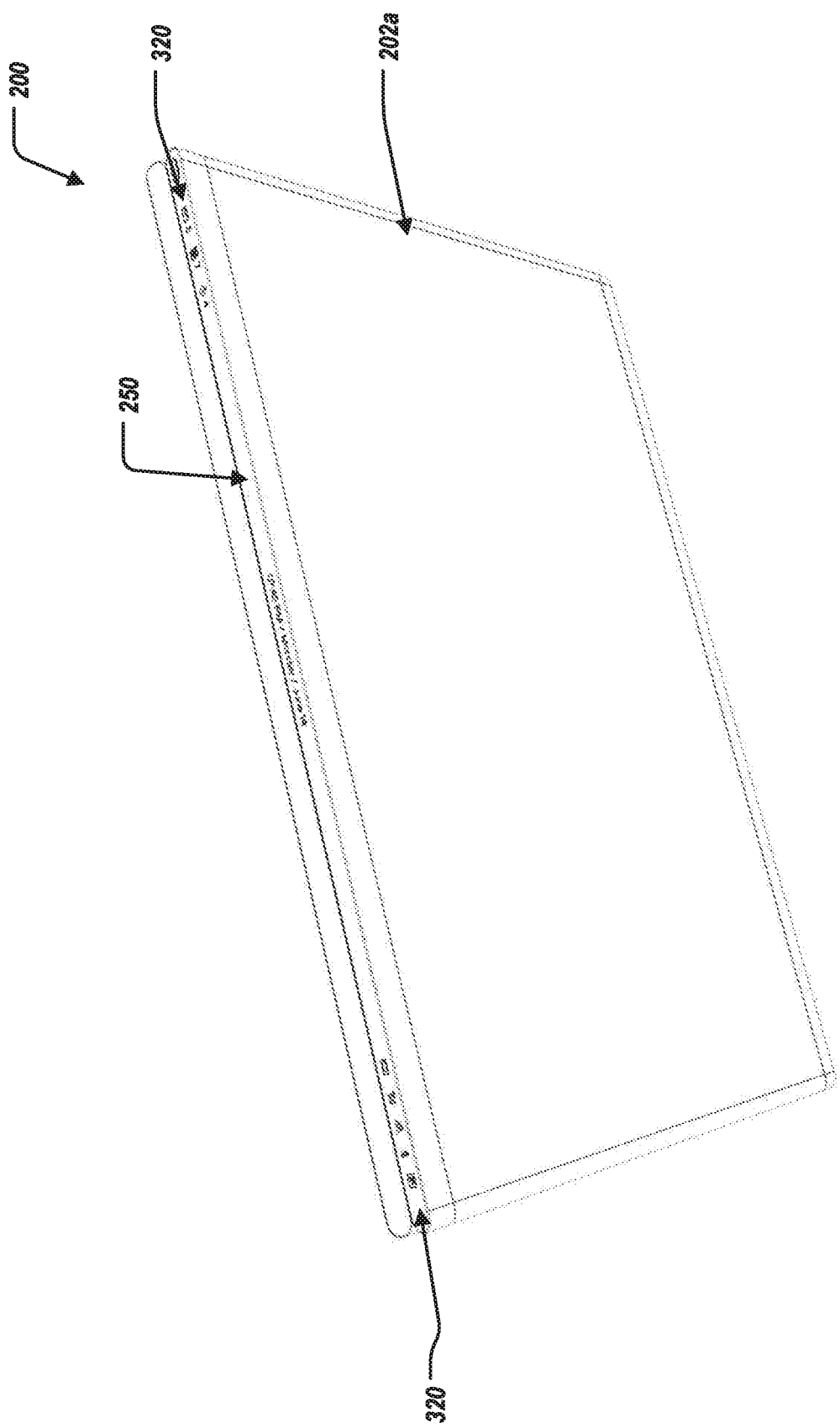
FIGS. 6-10 illustrate the information handling system in various states of the edge user interface display.

Referring to FIG. 6, the information handling system 200 is shown in a first use case example. For example, the relative positioning data 330 indicates that the information handling system 200 is in a closed state; and the orientation data 332 indicates that the information handling system 200 is in a vertical state. The edge UI management computing module 310, based on the relative positioning data 330 indicating that the information handling system 200 is in a closed state, and the orientation data 332 indicating that the information handling system 200 is in a vertical state, adjusts the display location of the edge UI display 320 to the front edge 250 of the first body 202a of the information handling system 200.

Figure 7:
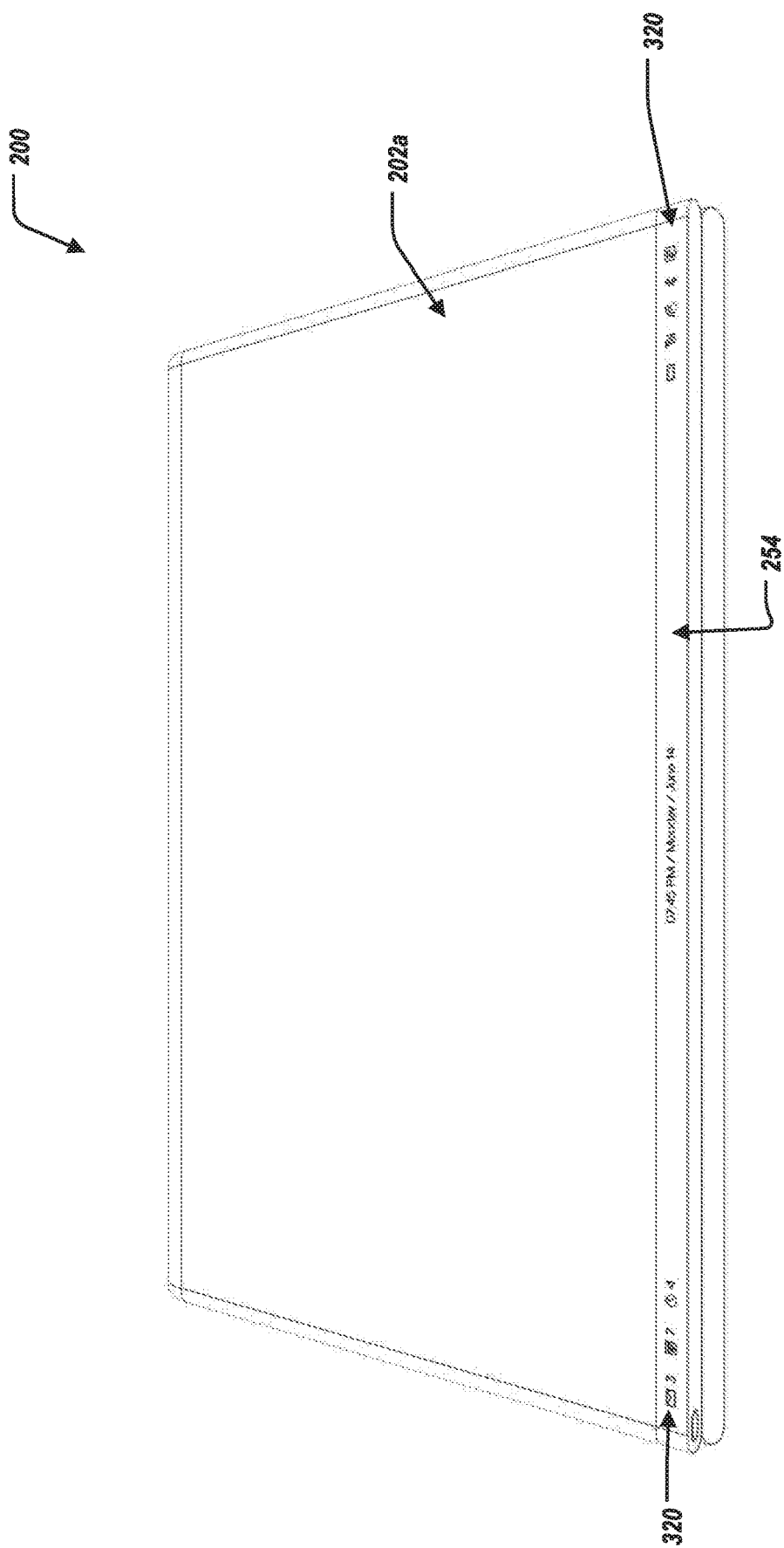

Referring to FIG. 7, the information handling system 200 is shown in a second use case example. For example, the relative positioning data 330 indicates that the information handling system 200 is in a closed state; and the orientation data 332 indicates that the information handling system 200 is in a horizontal state. The edge UI management computing module 310, based on the relative positioning data 330 indicating that the information handling system 200 is in a closed state, and the orientation data 332 indicating that the information handling system 200 is in a horizontal state, adjusts the display location of the edge UI display 320 to the upper edge 254 of the first body 202a of the information handling system 200.

Figure 8:
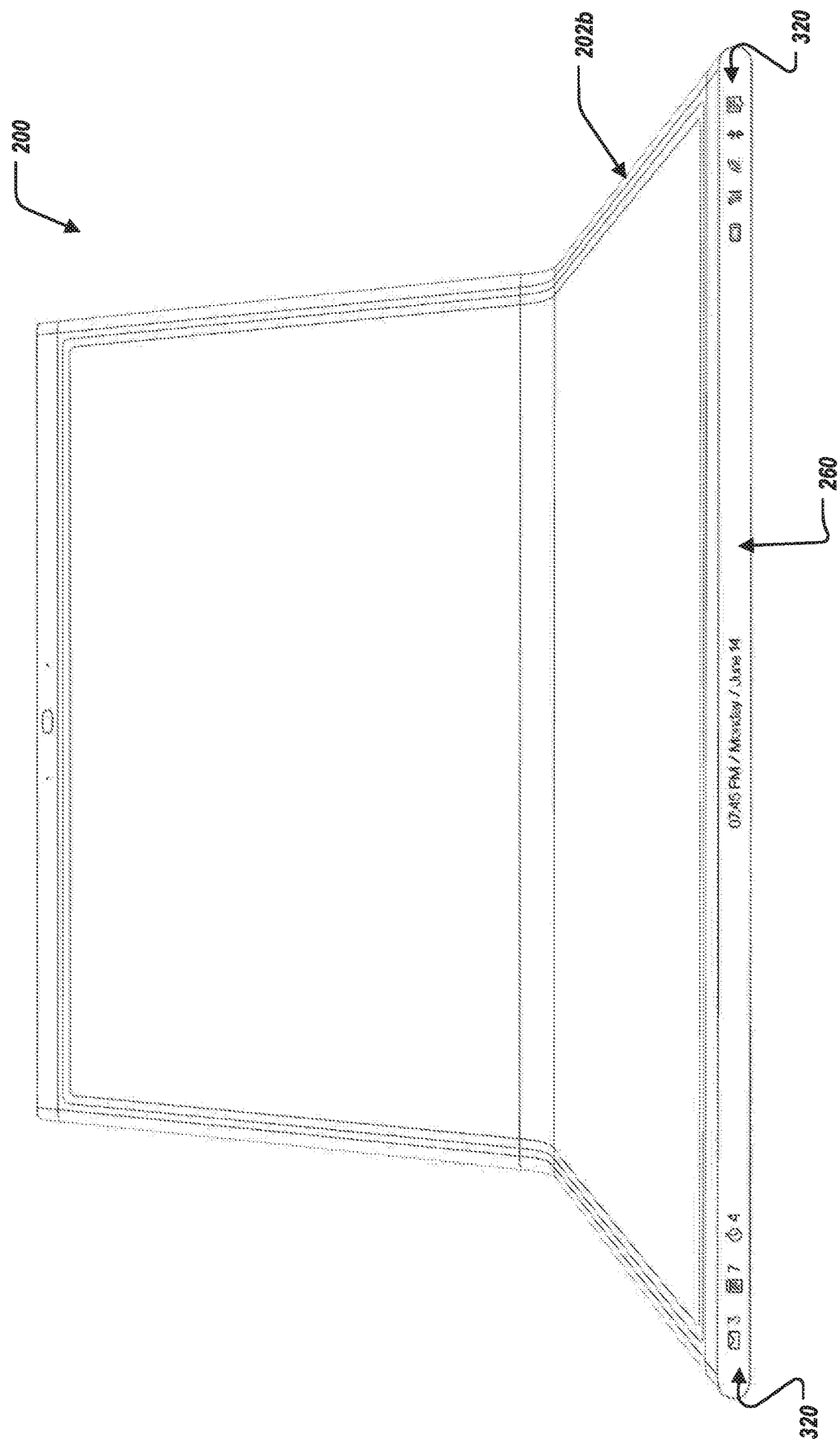

Referring to FIG. 8, the information handling system 200 is shown in a third use case example. For example, the relative positioning data 330 indicates that the information handling system 200 is in an open state; and the relative positioning data 334 indicates that the user (e.g., the user 602) is at a forward facing direction relative to the information handling system 200. The edge UI management computing module 310, based on the relative positioning data 330 indicating that the information handling system 200 is in an open state, and the orientation data 332 indicating that that the user is at a forward facing direction relative to the information handling system 200, adjusts the display location of the edge UI display 320 to the front edge 260 of the second body 202b of the information handling system 200.

Figure 9:
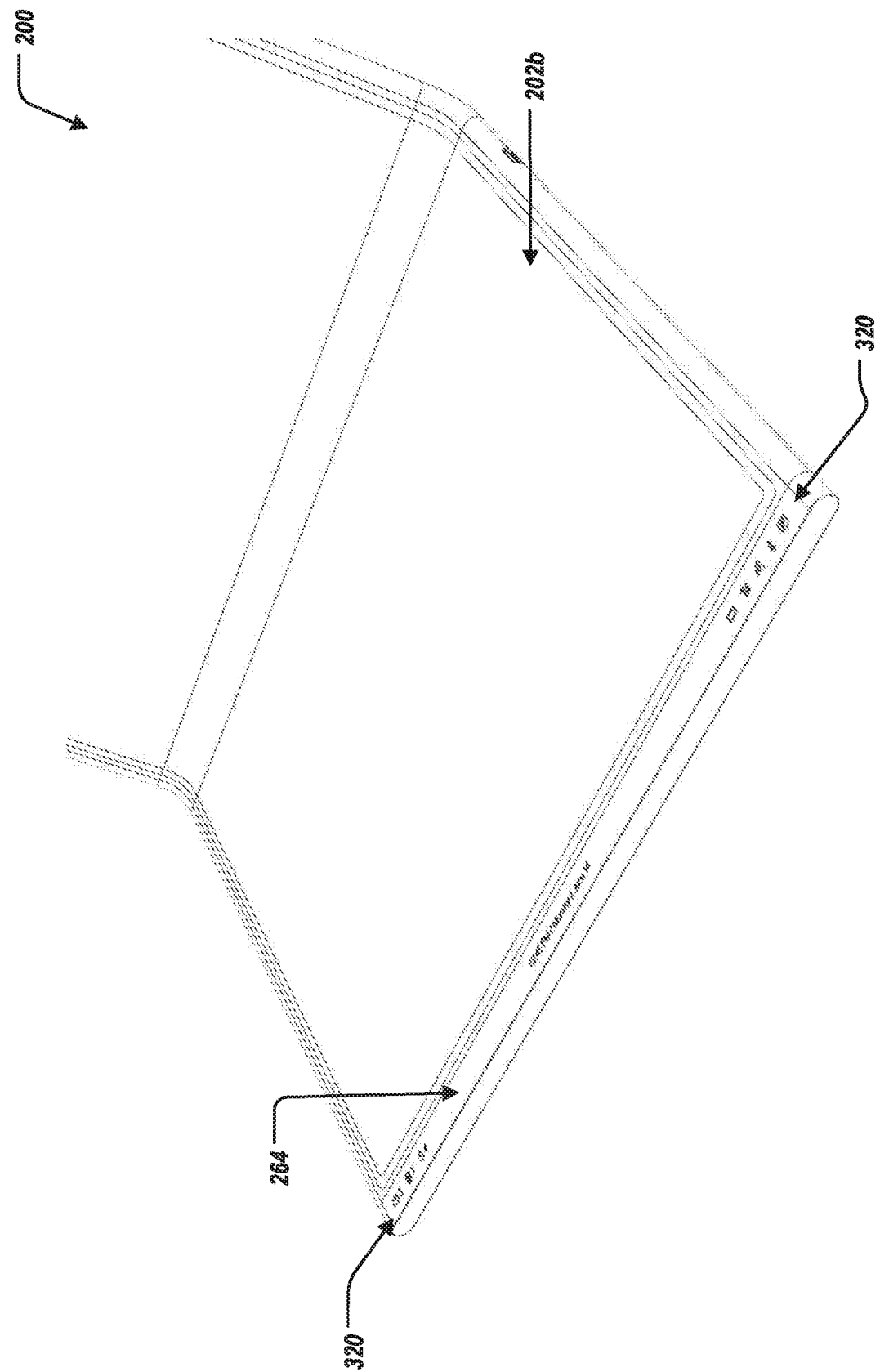

Referring to FIG. 9, the information handling system 200 is shown in a fourth use case example. For example, the relative positioning data 330 indicates that the information handling system 200 is in an open state; and the relative positioning data 334 indicates that the user (e.g., the user 602) is at an angled facing direction relative to the information handling system 200. The edge UI management computing module 310, based on the relative positioning data 330 indicating that the information handling system 200 is in an open state, and the orientation data 332 indicating that that the user is at an angled facing direction relative to the information handling system 200, adjusts the display location of the edge UI display 320 to the upper edge 264 of the second body 202b of the information handling system 200.

Figure 10:
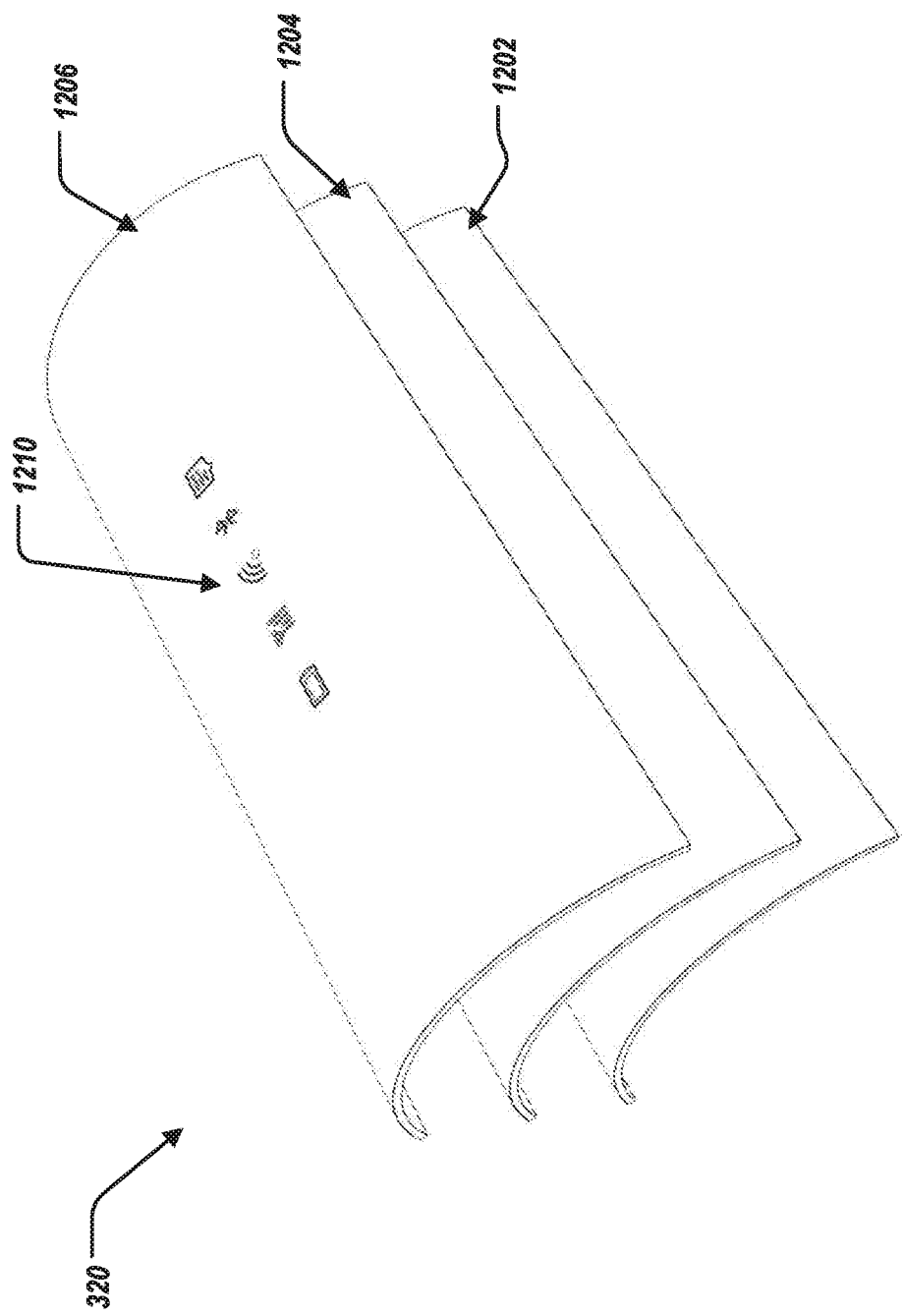

FIG. 10 illustrates an exploded view of the edge UI display 320. The edge UI display 320 includes an electrical contact layer 1202, a organic light emitting diode (OLED) layer 1204, and a cover layer 1206. The electrical contact layer 1202 can be in electrical communication with a power source to provide power to the OLED layer 1204. The OLED layer 1204 can provide for display icons 1210 that indicate various status indicators of the information handling system 200, such as battery level, connectivity, time, etc. In some examples, the edge UI display 320 is touch-sensitive such that upon detecting touch on one or more of the icons 1210, a display of the information handling system 200 can be updated corresponding to the icon 1210 that is touched. The cover layer 1206 can be a protective layer to the OLED layer 1204.

Figure 11:
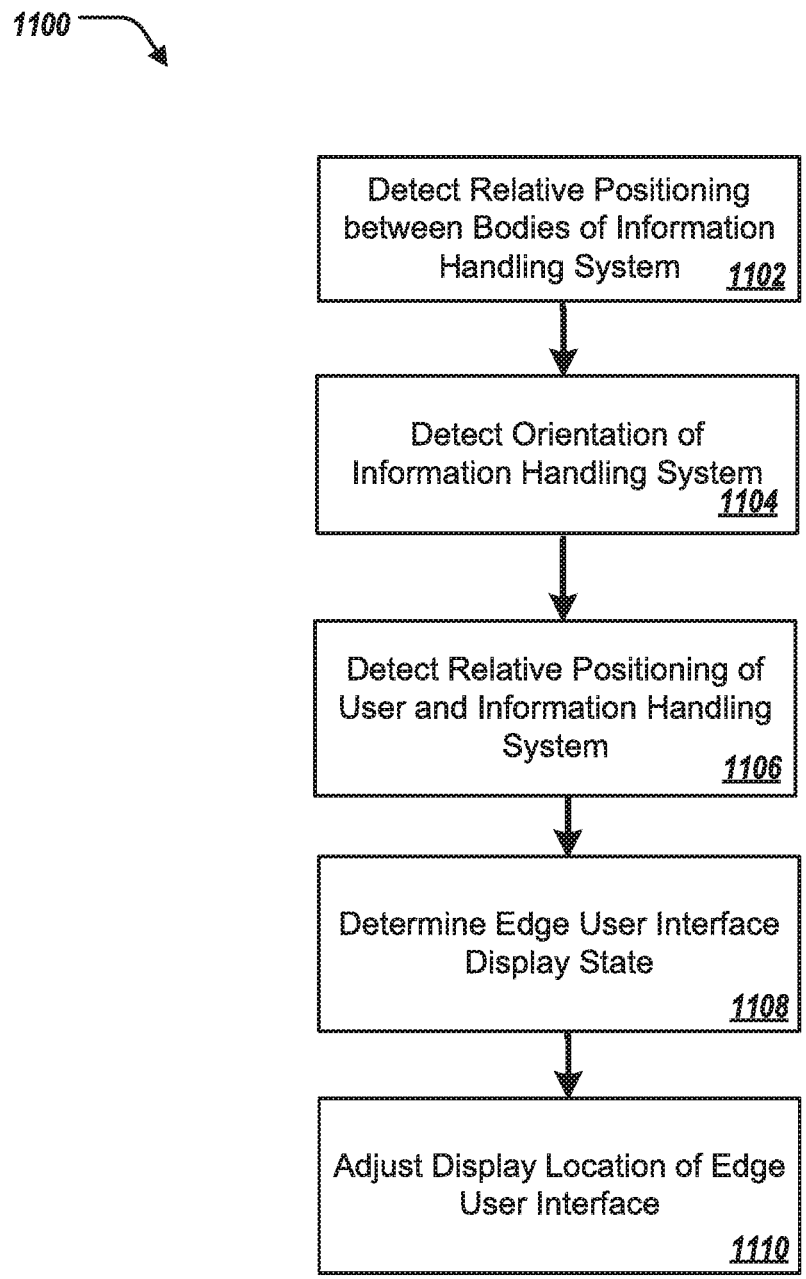
FIG. 11 illustrates a flowchart for a method for adjusting the edge user interface display.

FIG. 11 illustrates a flowchart depicting selected elements of an embodiment of a method 1300 for adjusting an edge user interface display. The method 1300 may be performed by the information handling system 100, the information handling system 200, and/or the edge UI management computing module 310 with reference to FIGS. 1-10. It is noted that certain operations described in method 1300 may be optional or may be rearranged in different embodiments.

The body positioning sensing module 312 detects a relative positioning between the first body 202a and the second body 202b of the information handling system 200 (1102). The orientation sensing module 314 detects an orientation of the information handling system 200 (1104). The user position sensing module 316 detects a relative positioning between the information handling system 200 and the user 602 of the information handling system (1106). The edge UI management computing module 310 determines the edge user interface display state 340 based on the i) relative positioning data 330 between the first body 202a and the second body 202b of the information handling system 200, ii) the orientation data 332 of the information handling system 200, and iii) the relative positioning data 334 between the information handling system 200 and the user 602 of the information handling system 200 (1108). The edge UI management computing module 310 adjusts a display location of the edge user interface display 320 based on the determined edge user interface display state 340 (1110).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
    detecting a relative positioning between a first body and a second body of a hinged information handling system, the first body including a first front edge and a first upper edge both positioned at a distal end from a hinge coupling the first body and the second body, the second body including a second front edge and a second upper edge both positioned at a distal end from the hinge coupling the first body and the second body opposite to the hinge, wherein the first front edge, the first upper edge, the second front edge, and the second upper edge each include a respective organic light emitting diode (OLED) layer for displaying an edge user interface;
    detecting an orientation of the hinged information handling system with respect to a surface;
    detecting a relative positioning between the hinged information handling system and a user of the hinged information handling system;
    determining an edge user interface display state indicating a positioning of an edge user interface display with respect to the first front edge, the first upper edge, the second front edge, the second upper edge, the positioning of the edge user interface display based on the i) relative positioning between the first body and the second body of the hinged information handling system, ii) the orientation of the hinged information handling system, and iii) the relative positioning between the hinged information handling system and the user of the hinged information handling system; and
    adjusting a display location of the edge user interface based on the determined edge user interface display state.

2. The computer-implemented method of claim 1, wherein detecting the relative positioning between the first body and the second body of the hinged information handling system further includes detecting a closed positioning between the first body and the second body of the hinged information handling system, and wherein detecting the orientation of the hinged information handling system further includes detecting a vertical orientation of the hinged information handling system, wherein the edge user interface display state is based on the closed positioning between the first body and the second body of the hinged information handling system and the vertical orientation of the hinged information handling system.

3. The computer-implemented method of claim 2, wherein adjusting the display location of the edge user interface further includes adjusting the display location of the edge user interface to the front edge of the first body of the hinged information handling system based on the closed positioning between the first body and the second body of the hinged information handling system and the vertical orientation of the hinged information handling system.

4. The computer-implemented method of claim 1, wherein detecting the relative positioning between the first body and the second body of the hinged information handling system further includes detecting a closed positioning between the first body and the second body of the hinged information handling system, and wherein detecting the orientation of the hinged information handling system further includes detecting a horizontal orientation of the hinged information handling system, wherein the edge user interface display state is based on the closed positioning between the first body and the second body of the hinged information handling system and the horizontal orientation of the hinged information handling system.

5. The computer-implemented method of claim 4, wherein adjusting the display location of the edge user interface further includes adjusting the display location of the edge user interface to the upper edge of the first body of the hinged information handling system based on the closed positioning between the first body and the second body of the hinged information handling system and the horizontal orientation of the hinged information handling system.

6. The computer-implemented method of claim 1, wherein detecting the relative positioning between the first body and the second body of the hinged information handling system further includes detecting an open positioning between the first body and the second body of the hinged information handling system, and wherein detecting the relative positioning between the hinged information handling system and the user of the hinged information handling system includes detecting forward facing direction of the user relative to the hinged information handling system, wherein the edge user interface display state is based on the open positioning between the first body and the second body of the hinged information handling system and the forward facing direction of the user relative to the hinged information handling system.

7. The computer-implemented method of claim 6, wherein adjusting the display location of the edge user interface further includes adjusting the display location of the edge user interface to the front edge of the second body of the hinged information handling system based on the open positioning between the first body and the second body of the hinged information handling system and the forward facing direction of the user relative to the hinged information handling system.

8. The computer-implemented method of claim 1, wherein detecting the relative positioning between the first body and the second body of the hinged information handling system further includes detecting an open positioning between the first body and the second body of the hinged information handling system, and wherein detecting the relative positioning between the hinged information handling system and the user of the hinged information handling system includes detecting an angled facing direction of the user relative to the hinged information handling system, wherein the edge user interface display state is based on the open positioning between the first body and the second body of the hinged information handling system and the angled facing direction of the user relative to the hinged information handling system.

9. The computer-implemented method of claim 8, wherein adjusting the display location of the edge user interface further includes adjusting the display location of the edge user interface to the upper edge of the second body of the hinged information handling system based on the open positioning between the first body and the second body of the hinged information handling system and the angled facing direction of the user relative to the hinged information handling system.

10. A hinged information handling system, comprising:
a body position sensor configured to detect a relative positioning between a first body and a second body of the hinged information handling system, the first body including a first front edge and a first upper edge both positioned at a distal end from a hinge coupling the first body and the second body, the second body including a second front edge and a second upper edge both positioned at a distal end from the hinge coupling the first body and the second body opposite to the hinge, wherein the first front edge, the first upper edge, the second front edge, and the second upper edge each include a respective organic light emitting diode (OLED) layer for displaying an edge user interface;
an orientation sensor configured to detect an orientation of the hinged information handling system with respect to a surface;
a user position sensor configured to detect a relative positioning between the hinged information handling system and a user of the hinged information handling system;
the edge user interface;
a memory media storing instructions;
a processor in communication with the memory media to execute the instructions to perform operations comprising:
determine an edge user interface display state indicating a positioning of an edge user interface display with respect to the first front edge, the first upper edge, the second front edge, the second upper edge, the positioning of the edge user interface display based on i) the relative positioning between the first body and the second body of the hinged information handling system, ii) the orientation of the hinged information handling system, and iii) the relative positioning between the hinged information handling system and the user of the hinged information handling system; and
adjust a display location of the edge user interface based on the determined edge user interface display state.

11. The hinged information handling system of claim 10, wherein the body position sensor detects a closed positioning between the first body and the second body of the hinged information handling system, and the orientation sensor detects a vertical orientation of the hinged information handling system, wherein the edge user interface display state is based on the closed positioning between the first body and the second body of the hinged information handling system and the vertical orientation of the hinged information handling system.

12. The hinged information handling system of claim 11, wherein the edge user interface management computing module adjusts the display location of the edge user interface to front edge of the first body of the hinged information handling system based on the closed positioning between the first body and the second body of the hinged information handling system and the vertical orientation of the hinged information handling system.

13. The hinged information handling system of claim 10, wherein the body position sensor detects a closed positioning between the first body and the second body of the hinged information handling system, and the orientation sensor detects a horizontal orientation of the hinged information handling system, wherein the edge user interface display state is based on the closed positioning between the first body and the second body of the hinged information handling system and the horizontal orientation of the hinged information handling system.

14. The hinged information handling system of claim 13, wherein the edge user interface management computing module adjusts the display location of the edge user interface to the upper edge of the first body of the hinged information handling system based on the closed positioning between the first body and the second body of the hinged information handling system and the horizontal orientation of the hinged information handling system.

15. The hinged information handling system of claim 10, wherein the body position sensor detects an open positioning between the first body and the second body of the hinged information handling system, and wherein then user positioning sensor detects a forward facing direction of the user relative to the hinged information handling system, wherein the edge user interface display state is based on the open positioning between the first body and the second body of the hinged information handling system and the forward facing direction of the user relative to the hinged information handling system.

16. The hinged information handling system of claim 15, wherein the edge user interface management computing module adjusts the display location of the edge user interface to the front edge of the second body of the hinged information handling system based on the open positioning between the first body and the second body of the hinged information handling system and the forward facing direction of the user relative to the hinged information handling system.

17. The hinged information handling system of claim 10, wherein the body position sensor detects an open positioning between the first body and the second body of the hinged information handling system, and wherein then user positioning sensor detects an angled facing direction of the user relative to the hinged information handling system, wherein the edge user interface display state is based on the open positioning between the first body and the second body of the hinged information handling system and the angled facing direction of the user relative to the hinged information handling system.

18. The hinged information handling system of claim 17, wherein the edge user interface management computing module adjusts the display location of the edge user interface to the upper edge of the second body of the hinged information handling system based on the open positioning between the first body and the second body of the hinged information handling system and the angled facing direction of the user relative to the hinged information handling system.

19. A non-transitory computer-readable medium storing software comprising instructions executable by one or more computers which, upon such execution, cause the one or more computers to perform operations comprising:

detecting a relative positioning between a first body and a second body of a hinged information handling system, the first body including a first front edge and a first upper edge both positioned at a distal end from a hinge coupling the first body and the second body, the second body including a second front edge and a second upper edge both positioned at a distal end from the hinge coupling the first body and the second body opposite to the hinge, wherein the first front edge, the first upper edge, the second front edge, and the second upper edge each include a respective organic light emitting diode (OLED) layer for displaying an edge user interface;

detecting an orientation of the hinged information handling system with respect to a surface;

detecting a relative positioning between the hinged information handling system and a user of the hinged information handling system;

determining an edge user interface display state indicating a positioning of an edge user interface display with respect to the first front edge, the first upper edge, the second front edge, the second upper edge, the positioning of the edge user interface display based on the i) relative positioning between the first body and the second body of the hinged information handling system, ii) the orientation of the hinged information handling system, and iii) the relative positioning between the hinged information handling system and the user of the hinged information handling system; and adjusting a display location of the edge user interface based on the determined edge user interface display state.

20. The non-transitory computer-readable medium of claim 19, wherein the operation of detecting the relative positioning between the first body and the second body of the hinged information handling system further includes detecting a closed positioning between the first body and the second body of the hinged information handling system, and wherein the operation of detecting the orientation of the hinged information handling system further includes detecting a vertical orientation of the hinged information handling system, wherein the edge user interface display state is based on the closed positioning between the first body and the second body of the hinged information handling system and the vertical orientation of the hinged information handling system.

* * * * *